Dec. 19, 1967   A. OFFNER   3,359,056

STABLE CYLINDRICAL LENS SYSTEMS

Filed Sept. 21, 1964

INVENTOR
Abe Offner
BY
ATTORNEYS

United States Patent Office 3,359,056
Patented Dec. 19, 1967

3,359,056
STABLE CYLINDRICAL LENS SYSTEMS
Abe Offner, Darien, Conn., assignor to The Perkin-Elmer Corporation, Norwalk, Conn., a corporation of New York
Filed Sept. 21, 1964, Ser. No. 397,845
6 Claims. (Cl. 350—181)

This invention relates to cylindrical lens systems and is directed to the provision of such systems having substantially the same equivalent focal length and/or back focal length for rays in a plane normal to the cylindrical axes thereof and for rays in inclined planes whose normals lie in the optical plane of the system.

A cylindrical lens has the property that is convergent or divergent power on a fan of rays in a plane inclined at an angle to a plane normal to the cylinder axis, with a normal to the inclined plane lying in the optical plane of the lens, is a function of the angle. Thus the focal length of the lens for a fan of rays in a normal plane is different than for a fan of rays in the inclined plane, and this limits the performance of optical systems containing cylindrical lenses.

The present invention provides a cylindrical lens system having a plurality of lens elements in which the focal lengths, spacing and refractive indices of the elements are correlated to yield substantially the same equivalent focal length, or substantially the same back focal length, for rays in both normal and inclined planes. A combination of two lens elements with proper correlation of these factors yields excellent results.

For some applications it may also be desired to have both equal equivalent focal lengths and equal back focal lengths for rays in the normal and inclined planes. While it is possible to fulfill both requirements with a two-element system, the solution may require individual elements of large power compared to the overall power of the system, and other restrictions may be present. In such case a system having three or more elements may be employed which affords greater flexibility of design.

The invention will be described in connection with several specific embodiments thereof.

Figure 1:
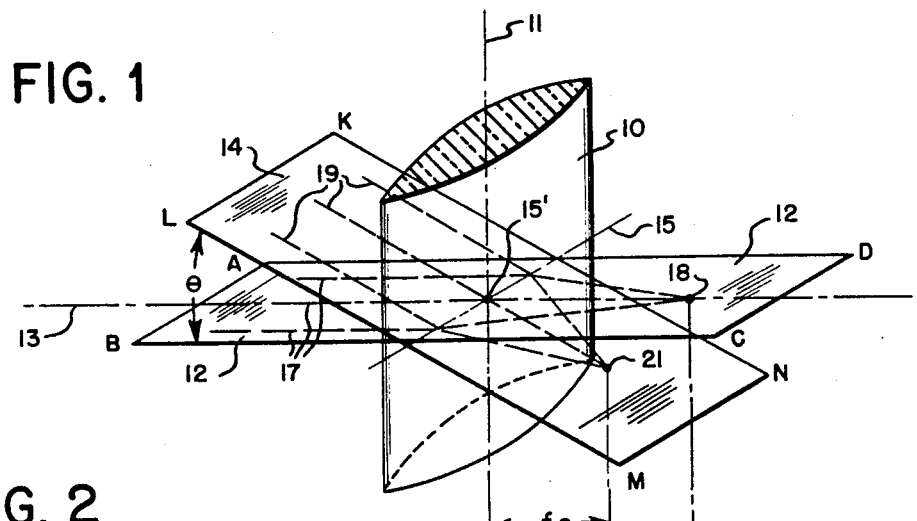
Figure 2:
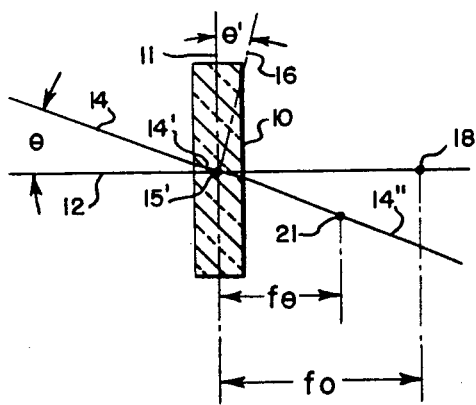
Figure 3:
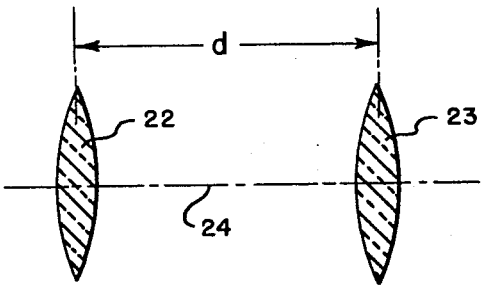
Figure 4:
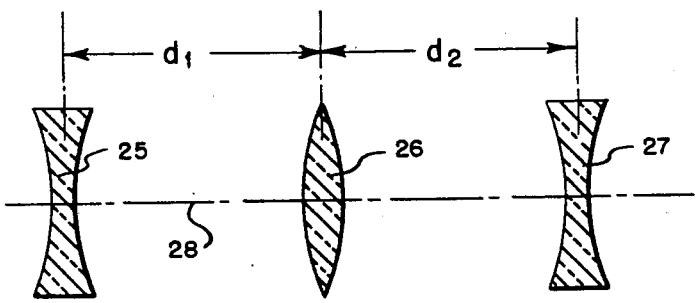

In the drawings:
FIG. 1 is a view showing a single cylindrical lens having different focal lengths for rays in a normal and in an inclined plane;
FIG. 2 shows a cross-section of the lens of FIG. 1, taken along the optical plane thereof;
FIG. 3 illustrates a two-element system in accordance with the invention; and
FIG. 4 illustrates a three-element system in accordance with the invention.

Referring to FIG. 1, a positive cylindrical lens 10 is shown having a center line 11 parallel to the axes (not shown) of the two cylindrical surfaces of the lens. Plane 12, also designated ABCD, is a plane normal to the center line 11 and hence to the cylinder axes. Center line 13 lies in plane 12 and is perpendicular to the cylindrical surfaces of the lens at the points of intersection therewith. The plane containing center lines 11 and 13 may be termed the optical plane of the lens, by analogy with the term optical axis for a spherical lens.

Inclined plane 14, also designated KLMN, makes an angle $\theta$ with the normal plane 12, and the planes intersect along line 15 which is perpendicular to center line 11 and hence to the cylinder axes. A normal to the inclined plane 14 lies in the optical plane of the lens.

FIG. 2 shows a cross-section of lens 10 taken along the optical plane thereof (the plane of the paper). In this view inclined plane 14 of FIG. 1 is shown in three sections 14, 14' and 14". Incident rays in section 14 will be refracted so that the angle which section 14' makes with plane 12 is smaller than $\theta$. Emergent rays in section 14" will be parallel to the incident rays, hence having the same angle $\theta$, but will be laterally displaced. Plane 12 and section 14' intersect at point 15' in the optical plane. Line 16 is normal to the section 14', and makes an angle $\theta'$ with center line 11 and hence with the cylinder axes. The angle $\theta'$ is the same as the angle that section 14' makes with plane 12. The detailed course of the rays shown in FIG. 2 is not shown in FIG. 1 to avoid undue complexity of illustration.

As illustrated in FIG. 1, a fan of rays 17 in a normal plane 12 and parallel to center line 13 will be brought to a focus at point 18. For convenience lens 10 will be considered to be a thin lens and focal lengths indicated with respect to center line 11. Accordingly the focal length for rays in a normal plane will be as indicated by $f_0$. A fan of rays 19 lying in inclined plane 14 will be brought to a focus at point 21 which is closer to the lens. The focal length for rays in the inclined plane is indicated as $f_\theta$. Both $f_0$ and $f_\theta$ are measured in the same direction, that is, normal to the center line 11 and hence to the cylinder axes.

The variation in focal length as a function of the angle can be determined from the known relationship $$\phi = (N_e - 1)C$$

where $\phi$ is the power of the lens $(1/f)$, $N_e$ is the effective refractive index ratio, and C is the curvature $(1/\text{radius})$. For rays in a normal plane, $\phi_0 = (N-1)C$ where N is the refractive index of the lens. For rays in an inclined plane, the effective refractive index is $\cos \theta$ in air and $N \cos \theta'$ in the lens. Hence $$\phi = \left(\frac{N \cos \theta'}{\cos \theta} - 1\right)C$$

Using the relationship sine $\theta = N \sin \theta'$, the ratio of the lens power for a fan of rays in inclined plane 14 to that for a fan of rays in normal plane 12 can be determined and expressed in terms of focal length. For small angles where $\theta^3$ and higher powers can be neglected, the following equation can be obtained:

$$f_\theta = f_0\left(1 - \frac{N+1}{2N}\theta^2\right) \quad (1)$$

The change of focal length with angle predicted by this equation is of the order of $\theta^2$. Thus for an angle 0.1 radian (5.7°), the change in focal length is of the order of 1%. Specifically, for ordinary optical glasses N lies between 1.5 and 2.0. Respective values of $(N+1)/2N$ are 0.833 and 0.75. Thus the coefficient of $\theta^2$ varies by about 10% for the entire range of ordinary optical glasses indices. For most glasses the range is much smaller, since values of N of 1.6 and 1.7 give respective coefficients of 0.812 and 0.794.

Referring now to FIG. 3, an optical system is shown having two cylindrical lenses 22, 23, spaced along the optical plane of the system. The optical plane will be perpendicular to the plane of the drawing and the edge thereof is indicated by center line 24. The sacing is shown as $d$. Let $f_1$ and $f_2$ be the focal lengths of lenses 22 and 23, respectively, and $N_1$ and $N_2$ their respective refractive indices. From the conventional equation applicable to thin lenses, the equivalent focal length $F_0$ for rays in a normal plane (plane of the drawing) will be:

$$F_0 = \frac{f_1 f_2}{f_1 + f_2 - d} \quad (2)$$

The back focal length is the distance from the last refracting surface to the focal plane of the system. Assuming rays traveling from left to right, and thin lenses, the back focal length $L_0'$ for rays in a normal plane is:

$$L_0' = F_0 - \frac{f_2 d}{f_1 + f_2 - d} = \frac{f_2(f_1 - d)}{f_1 + f_2 - d} \quad (3)$$

The equivalent focal length $F_\theta$ for rays in an inclined plane through the system of FIG. 3 can be obtained by using the relationship of Equation 1 for each of the focal lengths in Equation 2. For convenience let:

$$M_1 = (N_1 + 1)/N_1 \quad (4)$$
$$M_2 = (N_2 + 1)/N_2 \quad (5)$$

Then:

$$F_\theta = \frac{f_1 f_2 (1 - \tfrac{1}{2} M_1 \theta^2)(1 - \tfrac{1}{2} M_2 \theta^2)}{f_1 + f_2 - d - \tfrac{1}{2}\theta^2(f_1 M_1 + f_2 M_2)} \quad (6)$$

The combination of individual focal lengths, spacing and refractive indices yielding substantially equal equivalent focal lengths for rays in both normal and inclined planes can be obtained by finding solutions of Equations 2 and 6 for equal equivalent focal lengths. This can be accomplished by equating and solving the two equations, or by differentiating Equation 6 with respect to $\theta$ and setting the derivative equal to zero. Adopting the first approach and neglecting terms in $\theta^4$, the following condition for stability of focal length is obtained:

$$d = \frac{f_1 M_2 + f_2 M_1}{M_1 + M_2} \quad (7)$$

Thus if Equation 7 is satisfied, the focal lengths for rays in both normal and inclined lanes will be substantially equal. If the refractive indices are the same for the two lenses, Equation 7 becomes:

$$d = \frac{f_1 + f_2}{2} \quad (8)$$

As an example of the improvement which can be obtained, assume that $f_1$ and $f_2$ are each 1.00000, making $d = 1.00000$. From Equation 2 the equivalent focal length in the normal plane is 1.00000. For $\theta = 4°$, and a refractive index $N = 1.50000$ for both lenses, use of Equation 1 gives $(f_1)_\theta$ and $(f_2)_\theta$ equals to 0.996. Using these values in Equation 2, the equivalent focal length for rays in the inclined plane is 1.000016. The same result can be obtained by using Equation 6. Thus the difference in the focal lengths for rays in the normal plane and in a plane inclined 4° thereto is 0.0016%. On the other hand, for a single lens as shown in FIG. 1 having the same $f_0$ and $N$, Equation 1 gives an $f_\theta$ of 0.996, so that the difference in focal lengths os 0.4%. As will be seen, a substantial improvement results.

To establish the condition for stability of back focal length, Equation 1 can be used for each focal length in Equation 3 to obtain an expression for $L_\theta'$, the back focal length for rays in the inclined plane. This gives:

$$L_\theta' = \frac{f_2(1 - \tfrac{1}{2} M_2 \theta^2)[f_1(1 - \tfrac{1}{2} M_1 \theta^2) - d]}{f_1 + f_2 - d - \tfrac{1}{2}\theta^2(f_1 M_1 + f_2 M_2)} \quad (9)$$

Setting Equation 9 equal to Equation 3 and neglecting terms in $\theta^4$ yields:

$$d = f_1 \pm \sqrt{-f_1 f_2 M_1 / M_2} \quad (10)$$

Since $M_1$ and $M_2$ are both positive quantities, the expression under the radical indicates that the two lenses 22 and 23 in FIG. 3 must have opposite signs for a stable back focal length. If they have the same refractive index, Equation 10 reduces to:

$$d = f_1 \pm \sqrt{f_1 f_2} \quad (11)$$

As an illustrative example, assume $$f_1 = 1.00000, \ f_2 = 4.00000 \ \text{and} \ d_1 = 3.00000$$

which satisfies Equation 11. From Equation 3, the back focal length is $L_0'$ is $-1.33333$. From Equation 9, using refractive indices $N_1 = N_2 = 1.5$ yielding corresponding $M_1 = M_2 = 1.66667$, and $\theta = 4°$, the back focal length $L_\theta'$ is $-1.33332$. Thus the back focal length changes by only 0.001% as compared to 0.4% for the single lens of FIG. 1.

Equating Equations 7 and 10 gives the condition for stability with $\theta$ of both equivalent focal length and back focal length of the system of FIG 3:

$$\frac{f_1 M_2 + f_2 M_1}{M_1 + M_2} = f_1 \pm \sqrt{-f_1 f_2 M_1 / M_2} \quad (12)$$

There are two solutions to Equation 12, namely:

(A) $f_1 = -M_2 f_2 / M_1$ (13)
(B) $f_1 = -M_1 f_2 / M_2$ (14)

In either case, if $M_1 = M_2$ then $f_1 = -f_2$. From Equation 8, $d = 0$. This is a trivial solution consisting of two lenses of equal and opposite powers in contact, so that the combination has zero power.

Substituting the value of $f_1$ of Equation 13 into Equation 7 gives:

$$d = \frac{f_2(M_1 - M_2)}{M_1} = f_2 - \frac{f_2 M_2}{M_1} = f_1 + f_2 \quad (15)$$

This gives a telescopic system wherein the equivalent focal length given by Equation 2 and back focal length given by Equation 3 become infinite. The system is stable in both equivalent focal length and back focal length in the sense that it remains telescopic for moderate values of $\theta$, but the magnification can be shown to vary with $\theta$ which is usually not desirable.

Substituting the value of $f_1$ of Equation 14 into Equation 7 gives:

$$d = \frac{-M_1 f_2 + M_1 f_2}{M_1 + M_2} = 0 \quad (16)$$

This system consists of two thin lenses in contact. Assume, for example $$f_1 = 1.00000, \ f_2 = -1.07143$$
$$N_1 = 1.80000 \ \text{and} \ N_2 = 1.50000$$

Using these values in Equation 2 $F_0 = 15.000$ and $L_0'$ is the same. For $\theta = 0.1$ radian, $F_\theta = 15.000$ and $L_\theta'$ is the same. While this system is stable in both equivalent focal length and back focal length, the powers of the individual lenses are large compared to the power of the resultant system, about fifteen times in the particular example given.

Accordingly, although the two lens system of FIG. 3 can be designed to give either stable equivalent focal length or stable back focal length for normal and inclined planes, the fulfillment of both requirements simultaneously is subject to limitation which may be undesirable in practice.

FIG. 4 illustrates a three lens system which offers considerable flexibility in design. Here lenses 25, 26 and 27 are spaced along the optical plane of the system indicated by center line 28. The spacings are denoted $d_1$ and $d_2$. The outer lenses are shown as negative and the middle lens as positive, corresponding to a special case which will be discussed hereinafter. However, the conditions for stability will be developed in a general manner.

The focal length of lenses 25, 26, 27 will be denoted $f_1$, $f_2$ and $f_3$, respectively, and the corresponding refractive indices $N_1$, $N_2$ and $N_3$. Assuming thin lenses, the equivalent focal length $F_0$ is:

$$F_0 = \frac{f_1 f_2 f_3}{(d_1 - f_1 - f_2)(d_2 - f_2 - f_3) - f_2^2} \quad (17)$$

The back focal length may be expressed as:

$$L_0' = f_3 + \frac{(d_1 - f_1 - f_2) f_3^2}{(d_1 - f_1 - f_2)(d_2 - f_2 - f_3) - f_2^2} \quad (18)$$

The condition for stability of focal length for rays in a normal and in an inclined plane at an angle $\theta$ can be developed similarly to that for the two lens system. Thus an expression for $F_\theta$ is obtained by using the $f_\theta$ of Equation 1 for each of the focal lengths in Equation 17. The expression for $F_0$ and $F_\theta$ may then be equated. Neglecting terms in $\theta^4$ and higher powers of $\theta$, the condition for stability of equivalent focal length with $\theta$ is:

$$d_1d_2(M_1+M_2+M_3) - d_1f_2(M_1+M_3)$$
$$-d_1f_3(M_1+M_2) - d_2f_1(M_2+M_3) - d_2f_2(M_1+M_3)$$
$$+f_1f_2M_3 + f_1f_3M_2 + f_2f_3M_1 = 0 \quad (19)$$

The condition for stability of back focal length may be developed in a manner similar to that for the two lens case. If the condition is independent of stability of equivalent focal length it becomes quite involved. Since stability of either equivalent focal length or back focal length can be achieved by a two-lens combination, the three-lens combination will ordinarily be used when it is desired to obtain simultaneous stability of equivalent focal length and back focal length, and this therefore is the condition which will be developed here.

The procedure is to introduce the value of $f_\theta$ from Equation 1 for each focal length in Equation 18 to obtain an expression for $L_\theta'$, and equate the expressions for $L_0'$ and $L_\theta'$. The condition for stability of equivalent focal length, $F_0=F_\theta$, may then be introduced. Using the expressions for $M_1$ and $M_2$ of Equations 4 and 5, and a similar expression for $M_3$, and neglecting terms in $\theta^4$ and higher powers, the following expression is obtained:

$$d_1d_2M_3 + d_1f_2M_3 + d_1f_3(M_1+M_2) + d_2f_1M_3$$
$$+d_2f_2M_3 - f_1f_2M_3 - f_1f_3M_2 - f_2f_3M_1 = 0 \quad (20)$$

This gives the condition for stability of back focal length when the condition for stability of equivalent focal length (Equation 19) is satisfied. The back focal length condition may be further simplified by adding Equations 19 and 20. This results in:

$$d_1d_2(M_1+M_2) - d_1f_2M_1 - d_2f_1M_2 - d_2f_2M_1 = 0 \quad (21)$$

Acordingly, if both Equations 19 and 21 are satisfied, the system of FIG. 4 will be stable with $\theta$ in both equivalent focal length and back focal length.

If $N_1=N_2=N_3$, then $M_1=M_2=M_3$, and Equations 19 and 21 reduce to the following Equations 22 and 23, respectively:

$$3d_1d_2 - 2d_1(f_2+f_3) - 2d_2(f_1+f_2) + f_1f_2 + f_1f_3 + f_2f_3 = 0 \quad (22)$$

$$2d_1d_2 - d_1f_2 - d_2f_1 - d_2f_2 = 0 \quad (23)$$

As an illustrative example, let $N_1=N_2=N_3=1.5$ and let $d_1=d_2=1$. From Equation 23, $2-2f_2-f_1=0$. Let $f_1=1$ and $f_2=0.5$. Then, from Equation 22, $f_3=-1$. Computation for these values for $\theta=0.1$ radians yields $F_0=.50000$ and $F_\theta=.50006$, a difference of only 0.012%. Both $L_0'$ and $L_\theta$ are $-.50000$. For the single lens of FIG. 1, with $f_0=0.5$ and $N=1.5$, the change in focal length and back focal length would be 0.833%.

As another illustrative example, let $N_1=N_2=N_3=1.5$; $f_1=f_3=1$; $f_2=0.75$; and $d_1=d_2=.27596$. These values do not exactly satisfy Equations 22 and 23, yielding 0.00442 and .01433 instead of zero, respectively. However, computation yields $F_0=-2.6236$ and $F_\theta=-2.6241$, a change of only 0.20%. $L_0'=-2.8399$ and $L_\theta'=-2.8401$, a change of only 0.01%. The system of this example is symmetrical, and the lenses are of the form shown in FIG. 4. It is substantially stable with $\theta$ in equivalent focal length and in both front and back nodes. It is therefore particularly useful for imagery substantially independent of $\theta$ when both of the conjugates are at finite distances from the optical system.

Although the conditions for stability of equivalent focal length with $\theta$ for the two-lens and three-lens system appear to be quite different, it can be shown that Equation 7 is actually a special case of Equation 19. This is done by setting the power of the third lens and the value of $d_2$ equal to zero. Equation 19 can be put in terms of lens power rather than focal length by dividing by $f_1f_2f_3$. Denoting the lens powers as $\phi_1$, $\phi_2$, and $\phi_3$, the equation becomes:

$$d_1d_2(M_1+M_2+M_3)\phi_1\phi_2\phi_2 - d_1\phi_1\phi_3(M_1+M_3)$$
$$-d_1\phi_1\phi_2(M_1+M_2) - d_2\phi_2\phi_3(M_2+M_3)$$
$$-d_1\phi_1\phi_2(M_1+M_2) + \phi_2M_2 + \phi_1M_1 = 0 \quad (24)$$

With $d_2=0$ and $\phi_3=0$, this becomes:

$$-d_1\phi_1\phi_2(M_1+M_2) + \phi_2M_2 + \phi_1M_1 = 0 \quad (25)$$

Hence:

$$d_1 = \frac{\phi_1M_1 + \phi_2M_2}{\phi_1\phi_2(M_1+M_2)} \quad (26)$$

By substituting $\phi_1=1/f_1$ and $\phi'=1/f_2$, Equation 7 is obtained.

Due to the neglect of terms in $\theta^4$ and higher powers in deriving the foregoing conditions for stability with $\theta$, and the use of thin lens equations, the solutions in a given case will be slightly approximate and small departures therefrom can be used to further improve performance. A similar situation commonly exists in the design of high performance optical systems and will be understood by those skilled in the art.

The principles of the invention can be extended to systems using more than three cylindrical elements, althought it is not believed this will ordinarily be necessary.

I claim:

1. A cylindrical lens system having substantially the same equivalent focal length for rays in a plane normal to the cylinder axes and for rays in an inclined plane at an angle to the normal plane with a normal to the inclined plane lying in the optical plane of the system, which comprises a pair of cylindrical lenses spaced along the optical plane of the system with the axes of the lenses effectively substantially parallel, the spacing $d$ of said lenses being substantially equal to $$(f_1M_2 + f_2M_1)/(M_1+M_2)$$

where $f_1$ and $f_2$ are the focal lengths of the respective lenses and $M_1$ and $M_2$ are equal to $(N_1+1)/N_1$ and $(N_2+1)/N_2$, respectively, $N_1$ and $N_2$ being the refractive indices of the respective lenses.

2. A cylindrical lens system in accordance with claim 1 in which one lens has positive and the other lens has negative power and in which said spacing $d$ is also substantially equal to $f_1 \pm \sqrt{-f_1f_2M_1/M_2}$ to thereby yield substantially equal back focal lengths for rays in said normal and in said inclined planes.

3. A cylindrical lens system having substantially the same back focal length for rays in a plane normal to the cylinder axes and for rays in an inclined plane at an angle to the normal plane with a normal to the inclined plane lying in the optical plane of the system; which comprises a pair of cylindrical lenses having powers of opposite signs and spaced along the optical plane of the system with the axes of the lenses eefftcively substantially parallel, the spacing $d$ of said lenses being substantially equal to $f_1 \pm \sqrt{-f_1f_2M_1/M_2}$ where $f_1$ and $f_2$ are the focal lengths of the respective lenses and $M_1$ and $M_2$ are equal to $(N_1+1)/N_1$ and $(N_2+1)/N_2$, respectively, $N_1$ and $N_2$ being the refractive indices of the respective lenses.

4. A cylindrical lens system having substantially the same equivalent focal length for rays in a plane normal to the cylinder axes and for rays in an inclined plane at an angle to the normal plane with a normal to the inclined plane lying in the optical plane of the system, which comprises three cylindrical lenses spaced along the optical plane of the system with the axes of the lenses effectively substantially parallel, the spacing $d_1$ of the first and second lenses, spacing $d_2$ of the second and third lenses, focal lengths $f_1$, $f_2$ and $f_3$ of the respective lenses, and the quantities $M_1$, $M_2$ and $M_3$ equal to $(N_1+1)/N_1$, $(N_2+1)/N_2$ and $(N_3+1)/N_3$, respectively, where $N_1$, $N_2$ and $N_3$ are the refractive indices of the respective lenses, substantially complying with the equation:

$$d_1 d_2 (M_1+M_2+M_3) - d_1 f_2 (M_1+M_2)$$
$$- d_1 f_3 (M_1+M_2) - d_2 f_1 (M_2+M_3) - d_2 f_2 (M_1+M_3)$$
$$+ f_1 f_2 M_3 + f_1 f_3 M_2 + f_2 f_3 M_1 = 0$$

5. A cylindrical lens system in accordance with claim 4 having substantially equal back focal lengths for rays in said normal and rays in said inclined planes in which the recited quantities also substantially comply with the equation:

$$d_1 d_2 (M_1+M_2) - d_1 f_2 M_1 - d_2 f_1 M_2 - d_2 f_2 M_1 = 0$$

6. A cylindrical lens system in accordance with claim 4 having substantially equal back focal lengths for rays in said normal and rays in said inclined planes in which the recited quantities also substantially comply with the equation:

$$-d_1 d_2 M_3 + d_1 f_2 M_3 + d_1 f_3 (M_1+M_2) + d_2 f_1 M_3 + d_2 f_2 M_3$$
$$- f_1 f_2 M_3 - f_1 f_3 M_2 - f_2 f_3 M_1 = 0$$

References Cited

UNITED STATES PATENTS

| | | | |
|---|---|---|---|
| 1,945,950 | 2/1934 | Newcomer | 350—190 |
| 1,962,892 | 6/1934 | Chretien | 350—190 |
| 2,121,567 | 6/1938 | Newcomer | 350—190 |

JEWELL H. PEDERSEN, *Primary Examiner.*

R. J. STERN, *Assistant Examiner.*

UNITED STATES PATENT OFFICE
CERTIFICATE OF CORRECTION

Patent No. 3,359,056                                    December 19, 1967

Abe Offner

It is hereby certified that error appears in the above numbered patent requiring correction and that the said Letters Patent should read as corrected below.

Column 2, line 35, for "$\phi=$" read -- $\phi_\theta=$ --; line 53, for "glasses" read -- glass --; line 61, for "sacing" read -- spacing --; column 3, line 30, for "lanes" read -- planes --; line 41, for "equals" read -- equal --; line 49, for "os" read -- is --; line 67, equation 11, for "$f_1 f_2$" read -- $\underline{f}_1 f_2$ --; line 70, for "4.00000" read -- -4.00000 --; column 4, line 50, for "limitation" read -- limitations --; column 5, line 26, for "$d_1 d_2 M_3$" read -- $-d_1 d_2 M_3$ --; line 61, for "0.20%" read -- 0.02% --; column 6, equation (24) should appear as shown below instead of as in the patent:

$$d_1 d_2 (M_1+M_2+M_3)\phi_1\phi_2\phi_3 - d_1\phi_1\phi_3(M_1+M_3)$$
$$-d_1\phi_1\phi_2(M_1+M_2) - d_2\phi_2\phi_3(M_2+M_3)$$
$$-d_2\phi_1\phi_3(M_1+M_3) + \phi_3 M_3 + \phi_2 M_2 + \phi_1 M_1 = 0$$

same column 6, line 14, for "$\phi'=1/f_2$" read -- $\phi_2=1/f_2$ --;

line 56, for "eeffctively" read -- effectively --.

Signed and sealed this 25th day of March 1969.

(SEAL)
Attest:

EDWARD M. FLETCHER, JR.                              EDWARD J. BRENNER
Attesting Officer                                         Commissioner of Patents